(12) United States Patent
Kim et al.

(10) Patent No.: US 8,605,246 B2
(45) Date of Patent: Dec. 10, 2013

(54) LIQUID CRYSTAL DISPLAY DEVICE WHEREIN A FIRST AUXILIARY SPACER IS IN DIRECT CONTACT WITH A DRIVER AND A SIGNAL LINE AND COMPRISES A PLURALITY OF PATTERN STRUCTURES SPACED APART FROM EACH OTHER

(75) Inventors: Hong-Jae Kim, Gyeonggi-do (KR); Tae-Man Kim, Busan (KR); Keuk-Sang Kwon, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 10 days.

(21) Appl. No.: 13/236,377

(22) Filed: Sep. 19, 2011

(65) Prior Publication Data

US 2012/0008085 A1 Jan. 12, 2012

Related U.S. Application Data

(62) Division of application No. 11/822,119, filed on Jul. 2, 2007, now Pat. No. 8,045,126.

(30) Foreign Application Priority Data

Dec. 29, 2006 (KR) .................. 10-2006-0138872
Apr. 23, 2007 (KR) .................. 10-2007-0039311

(51) Int. Cl.
*G02F 1/1339* (2006.01)

(52) U.S. Cl.
USPC .......................... 349/156; 349/157

(58) Field of Classification Search
USPC ................... 349/38, 39, 156, 157
See application file for complete search history.

(56) References Cited

U.S. PATENT DOCUMENTS

| 4,295,712 | A | 10/1981 | Ishiwatari |
| 6,777,254 | B1 | 8/2004 | Yamazaki et al. |
| 2001/0051398 | A1 | 12/2001 | Hirakata et al. |
| 2003/0071959 | A1 | 4/2003 | Koyama |
| 2003/0117569 | A1 | 6/2003 | Kim et al. |
| 2003/0179340 | A1 | 9/2003 | Park et al. |
| 2003/0210358 | A1 | 11/2003 | Zhang |

(Continued)

FOREIGN PATENT DOCUMENTS

| JP | 8-248427 | 9/1996 |
| JP | 10-228022 | 8/1998 |

(Continued)

OTHER PUBLICATIONS

Office Action issued Sep. 28, 2009 in corresponding Korean Application No. 10-2007-003931l.

(Continued)

*Primary Examiner* — Paul Lee
(74) *Attorney, Agent, or Firm* — Morgan, Lewis & Bockius LLP

(57) ABSTRACT

A liquid crystal display device includes first and second substrates spaced apart from each other, on which a display area and a non-display area are defined, a liquid crystal layer interposed between the first and second substrates, a seal pattern in the non-display area between the first and second substrates, a driver in the non-display area on the first substrate, column spacers in the display area between the first and second substrates, and a first auxiliary spacer between the driver and the second substrate.

15 Claims, 8 Drawing Sheets

(56) References Cited

U.S. PATENT DOCUMENTS

| | | |
|---|---|---|
| 2004/0084673 A1* | 5/2004 | Hirakata et al. ............... 257/59 |
| 2004/0141128 A1* | 7/2004 | Kim et al. .................... 349/138 |
| 2004/0263765 A1 | 12/2004 | Han et al. |
| 2005/0052584 A1 | 3/2005 | Yamazaki et al. |
| 2005/0140912 A1 | 6/2005 | Hirakata |
| 2005/0156174 A1* | 7/2005 | Murakami et al. .............. 257/72 |
| 2005/0243262 A1* | 11/2005 | Kim et al. .................... 349/156 |
| 2005/0253994 A1* | 11/2005 | Kamijima et al. ............ 349/155 |
| 2006/0022201 A1 | 2/2006 | Kim et al. |
| 2006/0066604 A1 | 3/2006 | Yang |
| 2006/0087613 A1 | 4/2006 | Togawa et al. |
| 2006/0103802 A1* | 5/2006 | Miki et al. .................... 349/153 |
| 2006/0139553 A1 | 6/2006 | Kang et al. |

FOREIGN PATENT DOCUMENTS

| | | |
|---|---|---|
| JP | 10-325959 | 12/1998 |
| JP | 10-339889 A | 12/1998 |
| JP | 11-271803 | 10/1999 |
| JP | 2001-077373 | 3/2001 |
| JP | 2005-316375 A | 11/2005 |
| KR | 10-2005-0105529 | 11/2005 |

OTHER PUBLICATIONS

Office Action from Japanese Patent Office mailed Dec. 7, 2011 in Japanese counterpart application.

Office Action dated Jan. 10, 2013 from the French Patent Office in French counterpart application No. 0704696.

\* cited by examiner

LIQUID CRYSTAL DISPLAY DEVICE WHEREIN A FIRST AUXILIARY SPACER IS IN DIRECT CONTACT WITH A DRIVER AND A SIGNAL LINE AND COMPRISES A PLURALITY OF PATTERN STRUCTURES SPACED APART FROM EACH OTHER

The present invention is a divisional of U.S. patent application Ser. No. 11/822,119, filed Jul. 2, 2007 now U.S. Pat. No. 8,045,126, and claims the benefit of Korean Patent Application Nos. 10-2006-0138872, filed in Korea on Dec. 29, 2006 and 10-2007-0039311, filed in Korea on Apr. 23, 2007, all of which are hereby incorporated by reference.

BACKGROUND OF THE INVENTION

1. Field of the Invention

Embodiments of the invention relate to a display device, and more particularly, to a liquid crystal display device and a method of manufacturing the same. Although embodiments of the invention are suitable for a wide scope of applications, it is particularly suitable for preventing signal delay within a gate driver and gate lines for a gate-in-panel (GIP) type.

2. Discussion of the Related Art

Generally, liquid crystal display (LCD) devices, as flat panel display devices, change arrangement of liquid crystal molecules, which are initially arranged along a predetermined direction, by applying an electric field to the liquid crystal molecules to control transmittance of light passing through a liquid crystal cell to thereby display images. The liquid crystal cell is fabricated by arranging two substrates such that transparent electrodes of the substrates face each other, interposing a liquid crystal layer between two substrates, and sealing an injection hole. Polarizing films are attached on outer surfaces of the substrates. The light transmittance of the liquid crystal cell is controlled by the intensity of a voltage applied to the electrodes such that the liquid crystal cell displays graphic symbols/images by an optical shutter effect.

FIG. 1 is a flow chart illustrating a fabrication process of the related art liquid crystal cell for an LCD device. As shown in step st1 of FIG. 1, a first substrate and a second substrate are prepared. Thin film transistors and pixel electrodes connected to the thin film transistors are formed on the first substrate. A color filter layer and a common electrode covering the color filter layer are formed on the second substrate.

As shown in step st2 of FIG. 1, first and second alignment layers are formed on the first and second substrates, respectively. The first alignment layer covers the pixel electrodes, and the second alignment layer covers the common electrode. This step includes forming a polymeric thin film by coating the substrates with polymer and rubbing the polymeric thin film. The polymeric thin film should be deposited substantially over the entire surface of the first and second substrates with a uniform thickness and should be uniformly rubbed.

The rubbing method includes rubbing the alignment layer along the specific direction by a rubbing cloth, and has advantages such as easy orientation treatment, suitability to mass production, high stability of the orientation and easy controllability of a pre-tilt angle. Other methods, including photo-alignment, are also possible. An organic material of polyimide series is mainly used as the alignment layer, and a rubbing method is mainly used as the aligning method of the alignment layer.

As shown in step st3 of FIG. 1, a seal pattern, which forms a gap for liquid crystal material injection and prevents leakage of the liquid crystal material, is formed on one substrate. The seal patterning process involves forming a desired pattern by application of a thermosetting resin. A screen print method using a screen mask and a seal dispenser method using a dispenser are used for the seal patterning process. For the simplicity of fabrication, the screen print method has mainly been used. However, since the screen mask is not suitable for a wide substrate and a contamination by contact between the mask and the alignment layer often occurs, use of the seal dispenser method has gradually increased.

As shown in step st4 of FIG. 1, a spacer having a specific size to maintain a precise and uniform gap between the first and second substrates is deposited by spraying the spacer onto one of the first and second substrates. The spacer spray method can be divided into two different types: a wet spray method that involves spraying a mixture of alcohol and spacer material and a dry spray method that involves a spraying spacer material alone. The seal pattern and the spacer may be formed on different substrates. For example, the seal pattern may be formed on the second substrate, which has a relatively flat surface, and the spacer may be formed on the first substrate, which functions as a lower substrate.

As shown in step st5 of FIG. 1, the array and color filter substrates are arranged and attached by pressure-resistant hardening of the seal pattern. The aligning accuracy of the substrates is decided by a margin. If the substrates are attached beyond the margin, there is leakage of light, to thereby decrease the quality of images of the liquid crystal cell. Therefore, the aligning accuracy of several micrometers is required.

As shown in step st6 of FIG. 1, the attached liquid crystal substrate is divided into unit cells. A cell cutting process includes a scribe process that forms cutting lines on a surface of the substrate using a diamond pen or a cutting wheel of tungsten carbide, a hardness of which is higher than a hardness of the glass substrate, and a break process that divides the unit cells by force.

As shown in step st7 of FIG. 1, a liquid crystal material is injected into the unit cells. The unit cell has an area of several $cm^2$ and a gap of several micrometers. To effectively inject the liquid crystal material into the unit cell, a vacuum injection method using pressure difference between the inside and outside of the unit cells is commonly used as an effective injection method. Since fine air bubbles included in the liquid crystal material can deteriorate the display property of the unit cells, a bubble-eliminating process, in which the cells are kept in a vacuum state for a long period of time, is required.

After finishing the liquid crystal material injection, an injection hole is sealed to prevent leakage of the liquid crystal material. Generally, a ultra violet (UV) curable resin is deposited onto the injection hole by use of a dispenser and then ultra violet light is irradiated onto the resin, thereby hardening the resin and sealing the injection hole. The unit cell is then tested. After that, polarization films are attached on outer surfaces of the unit cell, and a driving circuit is connected to the unit cell using an attachment process.

Recently, a gate-in-panel (GIP) type LCD device has been suggested and developed. The GIP type LCD device, in which a gate driver is formed on a substrate of a liquid crystal panel, decreases manufacturing costs and minimizes power consumption.

FIG. 2 is a schematic view of a GIP type LCD device according to the related art. As shown in FIG. 2, a liquid crystal panel 1 includes a display area AA for displaying images and a non-display area NA surrounding the display area AA. In the display area AA, gate lines GL and data lines DL cross each other to define pixels P, and each pixel P includes a thin film transistor T, as a switching element, and a pixel electrode (not shown) connected to the thin film transistor T. The thin film transistor T switches on/off according to signals of the gate line GL and electrically connects the pixel electrode and the data line DL. The pixel electrode forms a liquid crystal capacitor Clc with a common electrode. The liquid crystal capacitor Clc is connected to a storage capacitor Cst.

A gate driver 2 is formed at a side of the non-display area NA, and a data driver 3 is attached at another side of the non-display area NA. The gate driver 2 sequentially provides gate-driving signals to the gate lines GL, so that the pixels P connected to one of the gate lines GL are selected. Whenever the gate lines GL are sequentially selected, the data driver 3 provides RGB data signals to the data lines DL. The data signals are provided to the pixels P, and an electric field is induced between the pixel electrode and the common electrode. The electric field varies according to the data signals. The transmittance of light passing though a liquid crystal layer is controlled by changing the electric field, and thus images are displayed.

In the GIP type LCD device, the gate driver 2 is formed on a substrate of the liquid crystal panel 1 through the same processes as the thin film transistor T of the pixel P. That is, at the step st1 of FIG. 1, elements of the gate driver 2 are formed when the thin film transistors and the pixel electrodes are formed on the first substrate. The data driver 3 may or may not be formed on the substrate of the liquid crystal panel 1.

FIG. 3 is a block diagram schematically illustrating a gate drive of a GIP type LCD device according to the related art. In FIG. 3, the gate driver 2 includes a shift register composed of N (N is a natural number) stage circuits. The stage circuits are driven by 4 clock signals.

A first stage circuit receives a first clock signal CLK1 and a starting signal VstN and outputs a first gate-driving signal Vout1 to a first gate line (not shown). A second stage circuit receives a second clock signal CLK2 and the first gate-driving signal Vout1, as a starting signal, and outputs a second gate-driving signal Vout2. A third stage circuit receives a third clock signal CLK3 and the second gate-driving signal Vout2, as a starting signal, and outputs a third gate-driving signal Vout3. A fourth stage circuit receives a fourth clock signal CLK4 and the third gate-driving signal Vout3, as a starting signal, and outputs a fourth gate-driving signal Vout4. A fifth stage circuit receives the first clock signal CLK1 and the fourth gate-driving signal Vout4, as a starting signal, and outputs a fifth gate-driving signal Vout5. At last, an Nth stage circuit receives a clock signal CLKm (m is one of 1 to 4) and an (N−1)th gate-driving signal (not shown), as a starting signal, and outputs an Nth gate-driving signal VoutN.

Each stage circuit of the gate driver 2 for the GIP type LCD device includes thin film transistors. Channel widths of the thin film transistors of the stage circuits are several hundred times larger than the thin film transistors formed in the display area AA of the liquid crystal panel 1 of FIG. 2. A parasitic capacitance may be induced between the thin film transistor of the gate driver 2 and a second substrate in the non-display area NA. The parasitic capacitance is larger than that in the display area AA. The parasitic capacitance lowers characteristics of the thin film transistor and affects the gate-driving signals Vout1 to VoutN to thereby cause incorrect operation. In addition, the fabrication process for the liquid crystal cell of FIG. 1 is carried out as the gate driver 2 is formed in the non-display area NA, and thus particles can go into the gate driver 2. Because particles may go into one of the thin film transistors of the gate driver 2, the thin film transistor may be shorted with others, and one stage circuit, which is connected to the shorted thin film transistor, may be totally turned OFF.

SUMMARY OF THE INVENTION

Accordingly, embodiments of the invention is directed to a liquid crystal display device and a method of manufacturing the same that substantially obviate one or more of the problems due to limitations and disadvantages of the related art.

An object of embodiments of the invention is to provide a liquid crystal display device and a method of manufacturing the same that prevent wrong working of a gate driver due to a parasitic capacitance between thin film transistors of the gate driver and a common electrode in a gate-in-panel (GIP) type.

Another object of embodiments of the invention is to provide a liquid crystal display device and a method of manufacturing the same that prevent electrical short due to particles going to the gate driver.

Another object of embodiments of the invention is to provide a liquid crystal display device and a method of manufacturing the same that solve a problem of lowering output of gate-driving signals due to line delay of the gate driver and a signal line connected to the gate driver.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes first and second substrates spaced apart from each other, on which a display area and a non-display area are defined, a liquid crystal layer interposed between the first and second substrates, a seal pattern in the non-display area between the first and second substrates, a driver in the non-display area on the first substrate, column spacers in the display area between the first and second substrates, and a first auxiliary spacer between the driver and the second substrate.

In another aspect, a liquid crystal display device includes first and second substrates spaced apart from each other, on which a display area and a non-display area are defined, a liquid crystal layer interposed between the first and second substrates, a seal pattern in the non-display area between the first and second substrates, a driver with a signal line in the non-display area on the first substrate, column spacers in the display area between the first and second substrates, and an auxiliary spacer between the signal line and the second substrate in the non-display area.

In another aspect, a method of manufacturing a liquid crystal display device having first and second spaced apart substrates and each having a display area and a non-display area includes forming a seal pattern in the non-display area between the first and second substrates, forming a driver in the non-display area on the first substrate, forming column spacers in the display area between the first and second substrates, forming an auxiliary spacer on a signal line for the driver in the non-display area, and forming a liquid crystal layer interposed between the first and second substrates.

In yet another aspect, a method of manufacturing a liquid crystal display device includes preparing first and second substrates, on which a display area and a non-display area are defined, forming a driver in the non-display area on the first substrate, forming column spacers in the display area on one of the first and second substrates, forming a first auxiliary spacer in the non-display area on one of the first and second substrates, the first auxiliary spacer corresponding to the driver, forming a seal pattern in the non-display area on one of the first and second substrates, and attaching the first and second substrates.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 4:
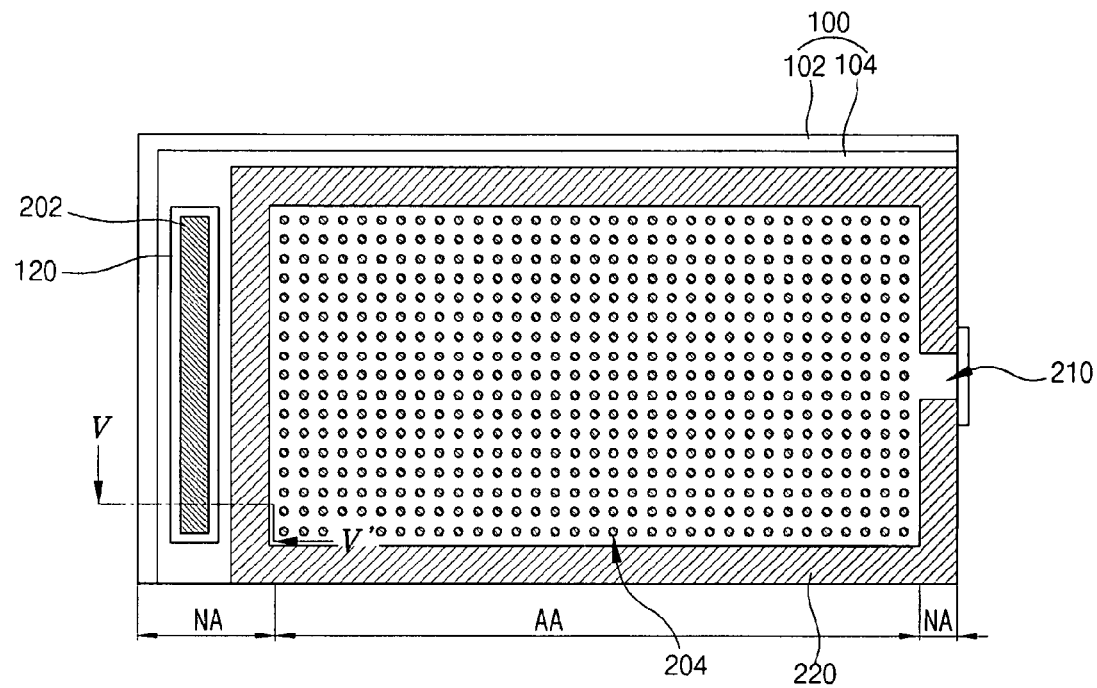
FIG. 4 is a schematic plan view illustrating a liquid crystal panel for an LCD device according to a first embodiment of the invention.

FIG. 4 is a schematic plan view illustrating a liquid crystal panel for a liquid crystal display (LCD) device according to a first embodiment of the invention. As shown in FIG. 4, a liquid crystal panel 100 includes a first substrate 102 and a second substrate 104. A display area AA for displaying images and a non-display area NA surrounding the display area AA are defined in the first and second substrates 102 and 104. Column spacers 204 are disposed in the display area AA and are spaced apart from each other with a certain distance. The column spacers 204 keep a cell gap uniform. The column spacers 204 are formed through a photolithographic process patterning a thin film using a photosensitive material, such as photoresist. The column spacers 204 may be formed on the second substrate 104. Acrylic organic materials are used as a material for the column spacers 204. The column spacers 204 may be formed by directly exposing and developing a photosensitive organic material without using photoresist. A seal pattern 220 is formed in the non-display area NA adjacent to the display area AA between the first and second substrates 102 and 104. The seal pattern 220 has a liquid crystal injection hole 210 at a side. A liquid crystal layer (not shown) is interposed inside the seal pattern 220 between the first and second substrates 102 and 104.

Figure 1:
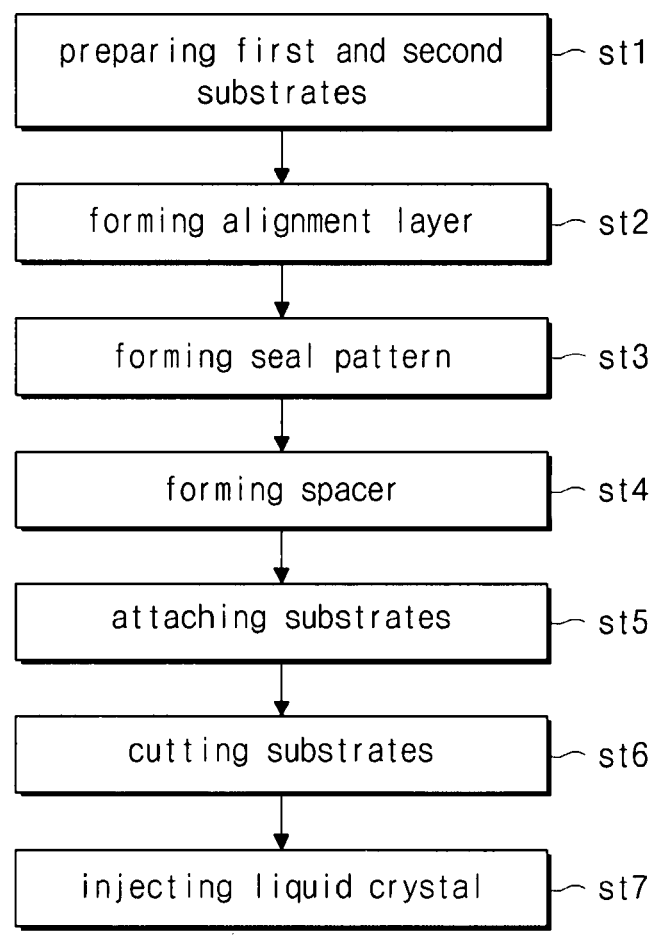
FIG. 1 is a flow chart illustrating a fabrication process of a related art liquid crystal cell for an LCD device.
Figure 2:
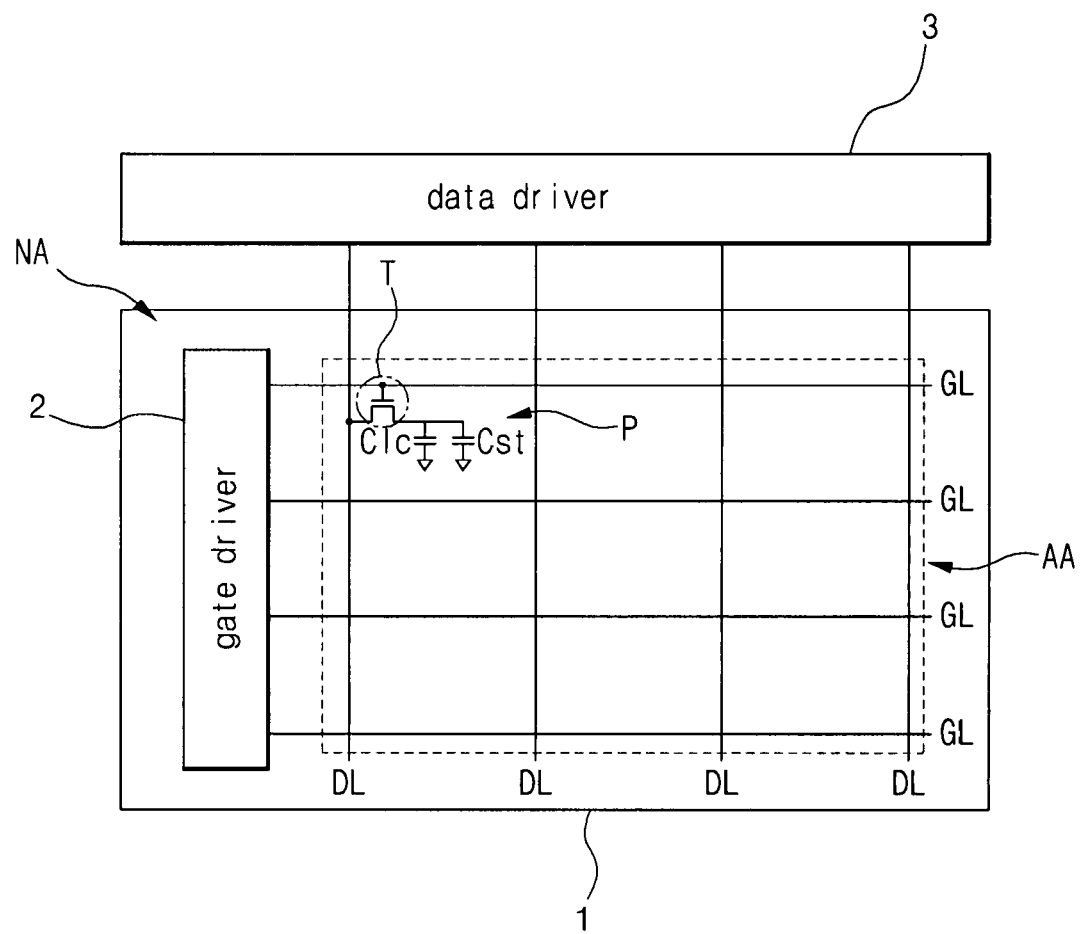
FIG. 2 is a schematic view of a GIP type LCD device according to the related art.
Figure 3:
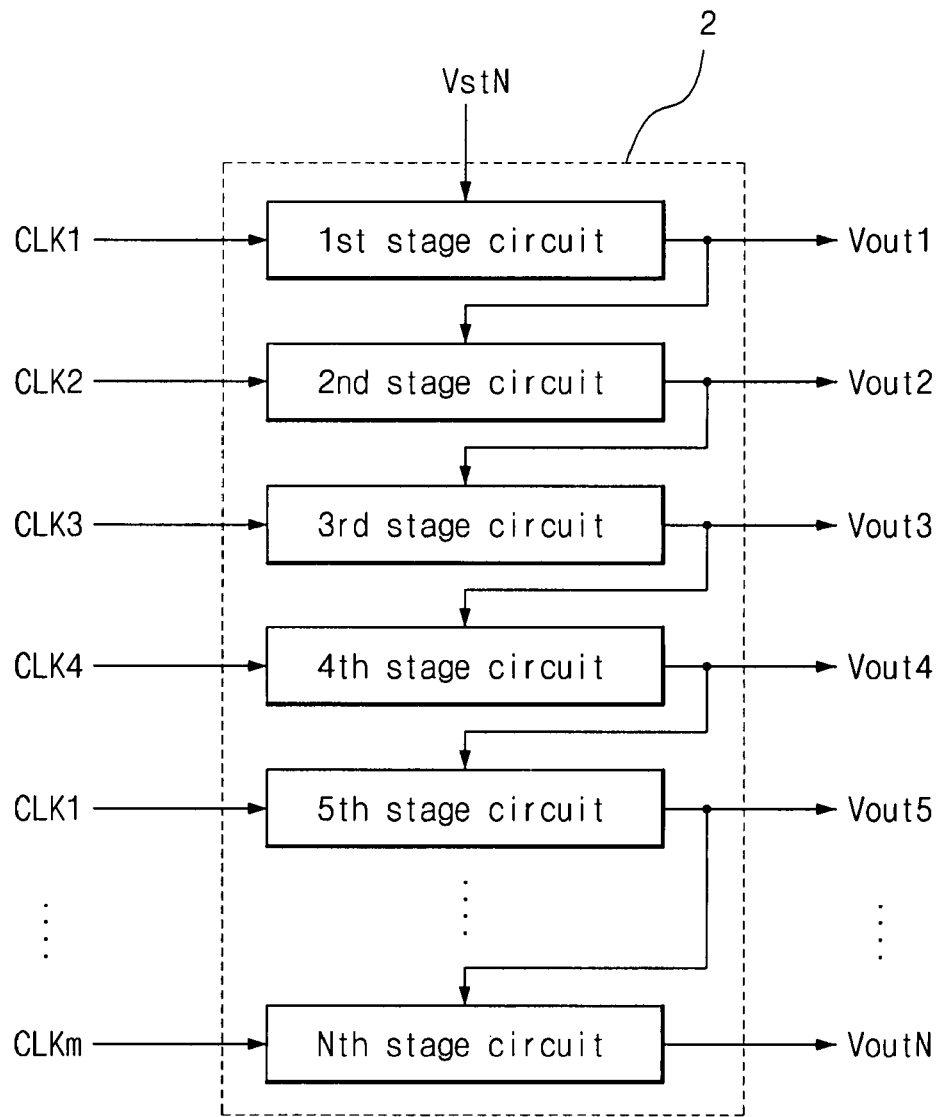
FIG. 3 is a block diagram schematically illustrating a gate drive of a GIP type LCD device according to the related art.

A gate driver 120 is formed on the first substrate 102 in the non-display area NA. An auxiliary spacer 202 is disposed on the gate driver 120 and is formed of an organic material. The auxiliary spacer 202 is on top of the gate driver 120. The auxiliary spacer 202 contacts the second substrate 104. The auxiliary spacer 202 and the column spacers 204 can be formed at the same time on either the first substrate 102 or the second substrate 104. Thus, the auxiliary spacer 202 can be formed of the same material and through the same process as the column spacers 204. In this case, an additional process to form the auxiliary spacer 202 is not required. Since the auxiliary spacer 202 is on top of the gate driver 120, the particles are prevented from going into the gate driver 120 after attaching the first and second substrates 102 and 104, as described in step st5 of FIG. 1.

Figure 5:
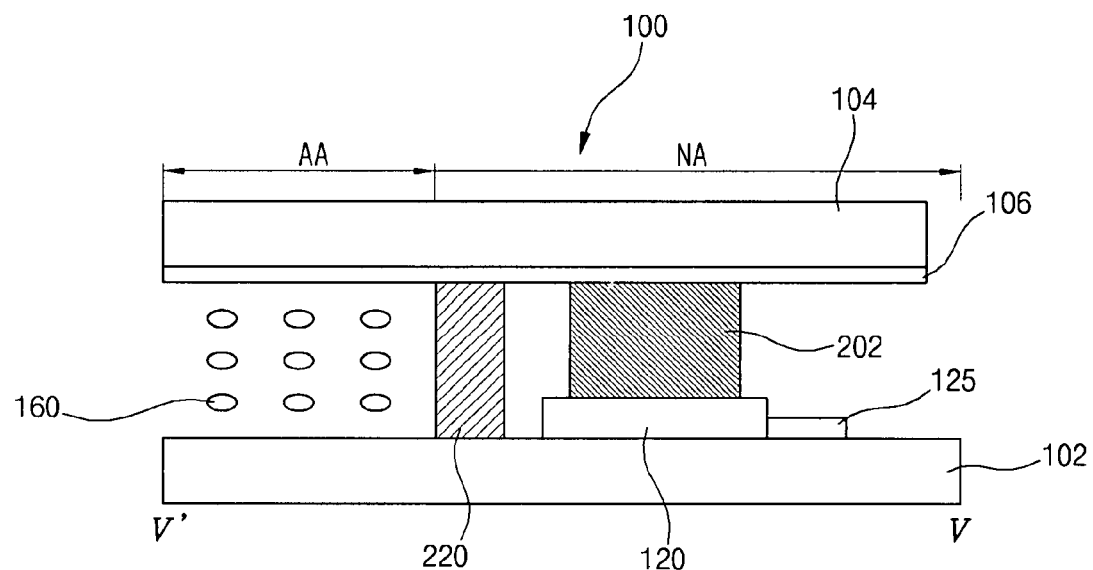
FIG. 5 is a cross-sectional view along the line V-V' of FIG. 4.

FIG. 5 is a cross-sectional view along the line V-V' of FIG. 4. As shown in FIG. 5, first and second substrates 102 and 104 are spaced apart from each other. A seal pattern 220 is formed between the first and second substrates 102 and 104. An area inside the seal pattern 220 is defined as a display area AA, and an area outside the seal pattern 220 including a region for the seal pattern 220 is defined as a non-display area NA. A liquid crystal layer 160 is interposed in the display area AA between the first and second substrates 102 and 104.

A gate driver 120 and a signal line 125 for the gate driver 120 are formed on an inner surface of the first substrate 102 in the non-display area NA. A common electrode 106 is formed on an inner surface of the second substrate 104 in the display area AA and in the non-display area NA. An auxiliary spacer 202 is disposed between the second substrate 104 and the gate driver 120. The auxiliary spacer 202 is on the common electrode 106 in the non-display area NA of the second substrate. Accordingly, particles do not enter into the gate driver 2 after attaching the first and second substrates 102 and 104.

Another example of the first embodiment will be described with reference to the accompanying drawing. As the size of the liquid crystal panel increases, the signal line for the gate driver gets longer, and output of the gate-driving signals may be lowered due to signal delay. Another example of the first embodiment may solve this problem.

Figure 6:
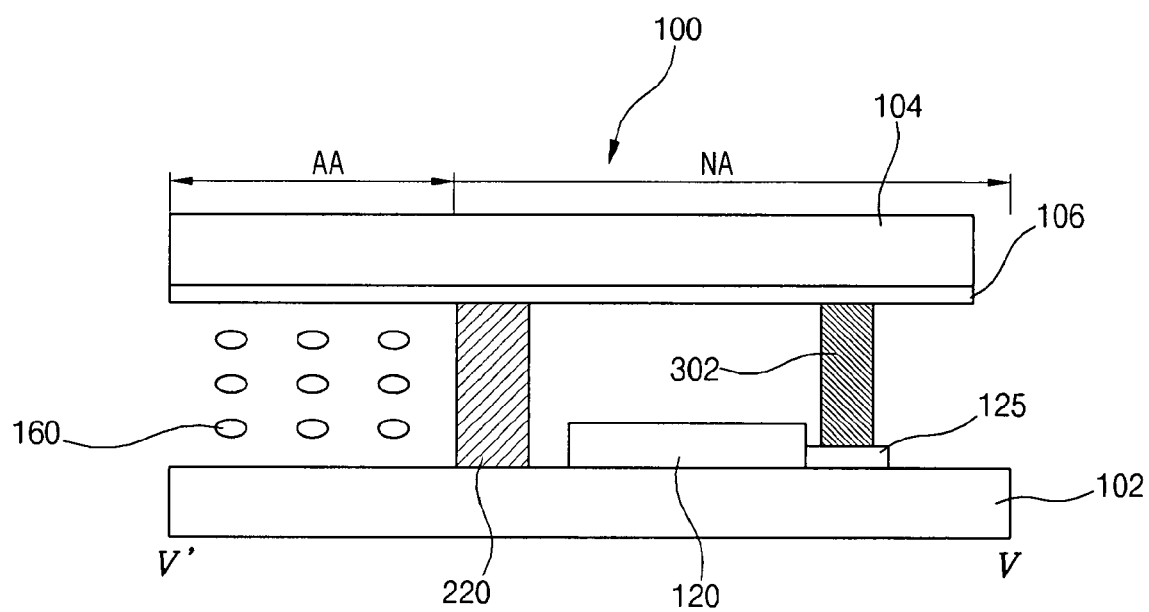
FIG. 6 is a cross-sectional view of a liquid crystal panel according to another example of the first embodiment.

FIG. 6 is a cross-sectional view of a liquid crystal panel according to another example of the first embodiment. For the convenience of explanation, the same parts as the example of FIG. 5 may have the same references. As shown in FIG. 6, first and second substrates 102 and 104 are spaced apart from each other. A seal pattern 220 is formed between the first and second substrates 102 and 104. An area inside the seal pattern 220 is defined as a display area AA, and an area outside the seal pattern 220 including a region for the seal pattern 220 is defined as a non-display area NA.

A liquid crystal layer 160 is interposed in the display area AA between the first and second substrates 102 and 104. A gate driver 120 and a signal line 125 for the gate driver 120 are formed on an inner surface of the first substrate 102 in the non-display area NA. A common electrode 106 is formed on an inner surface of the second substrate 104 in the display area AA and the non-display area NA.

In the example of FIG. 6, an auxiliary spacer 302 is disposed in the non-display area NA between the common electrode 106 and the signal line 125 for the gate driver 120. In the alternative, the auxiliary spacer 202 of FIG. 5 or 302 of FIG. 6 may be formed on both the gate driver 120 and the signal line 126, respectively. In this case, the step difference between the gate driver 120 and the signal line 125 may be considered.

Meanwhile, an Ag-dot, generally, is formed between the first and second substrates 102 and 104 to connect the common electrode 106 on the second substrate 104 to a driver (not shown) packaged on the first substrate 102. However, there are problems in that a process for forming the Ag-dot is very complicated and requires a lot of time. Accordingly, a method of connecting the common electrode to the driver by using a seal pattern, which includes conductive ball spacers therein, is used. However, the first embodiment can not be used with such a conductive seal pattern since the conductive seal pattern will short out the signal lines.

Figure 7:
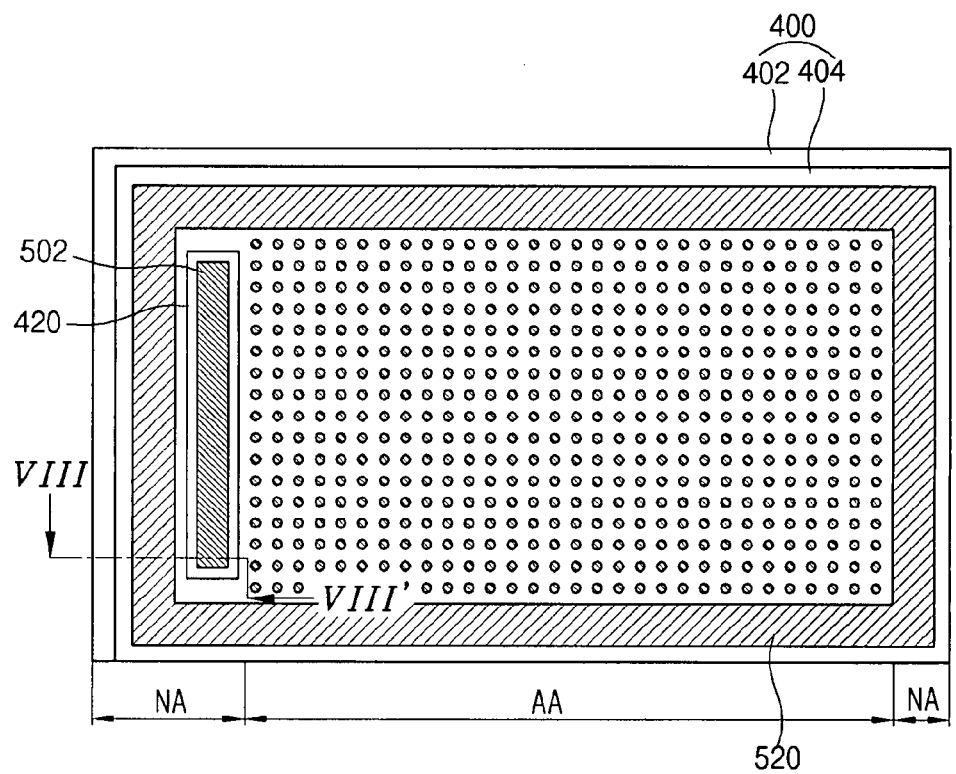
FIG. 7 is a plan view of a liquid crystal panel for an LCD device according to a second embodiment.
Figure 8:
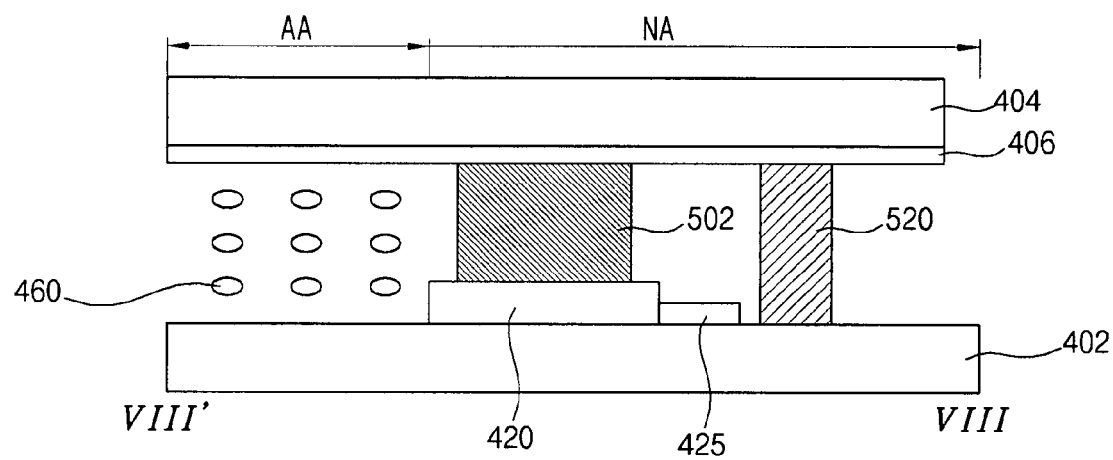
FIG. 8 is a cross-sectional view along the line VIII-VIII' of FIG. 7.

FIG. 7 and FIG. 8 illustrate a liquid crystal panel using the seal pattern according to a second embodiment of the invention. FIG. 7 is a plan view of a liquid crystal panel for an LCD device according to the second embodiment. FIG. 8 is a cross-sectional view along the line VIII-VIII' of FIG. 7.

As shown in FIG. 7 and FIG. 8, the liquid crystal panel 400 of the second embodiment includes first and second substrates 402 and 404 that overlap each other. A display area AA and a non-display area NA are defined on the first and second substrates 402 and 404. The display area AA displays images, and the non-display area NA surrounds the display area AA. Although not shown in the figures, gate lines and data lines cross one another to define pixel regions on an inner surface of the first substrate 402. A thin film transistor is disposed at each crossing portion of the gate and data lines. A pixel electrode is disposed in each pixel region and is connected to the thin film transistor. A storage capacitor may be formed in the pixel region and may be connected to the pixel electrode.

A black matrix (not shown), a color filter layer (not shown) and a common electrode 406 are formed on an inner surface of the second substrate 404 in the display area AA. The common electrode 406 extends into the non-display area NA. The common electrode 406 and the pixel electrode (not shown) constitute a liquid crystal capacitor.

Column spacers 504 are formed in the display area AA between the first and second substrates 402 and 404. The column spacers 504 keep a cell gap, i.e., a distance between the first and second substrates 402 and 404, uniform.

A seal pattern 520 is formed in the non-display area NA and surrounds the display area AA. The column spacers 504 and the seal pattern 520 may be formed on different substrates. The column spacers 504 may be formed on the inner surface of the second substrate 404, and the seal pattern 520 may be formed on the inner surface of the first substrate 402. Alternatively, the column spacers 504 and the seal pattern 520 may be formed on the same substrate.

A gate driver 420 and a signal line 425 for the gate driver 420 are formed on the inner surface of the first substrate 402 in the non-display area NA. The gate driver 420 and the signal line 425 are disposed inside of the seal pattern 520.

A liquid crystal layer 460 is interposed in the display area AA between the first and second substrates 402 and 404. Here, the seal pattern 520 may have a closed structure, which may be used with a liquid crystal dropping method. In the case of manufacturing an LCD device using the liquid crystal dropping method, a seal pattern is formed on a substrate of the liquid crystal panel, and column spacers are formed on another substrate. Then, liquid crystal is dropped on the substrate, including the column spacers. Next, the substrates are attached, and the attached substrates are cut into unit cells. In the liquid crystal dropping method, since the liquid crystal is directly dropped on the substrate, manufacturing time is relatively short. An amount of the liquid crystal dropped on the substrate is substantially accurately controlled, and little liquid crystal is wasted. The liquid crystal may be dropped on the substrate, including the seal pattern, but it is desirable that the liquid crystal is dropped on the substrate excluding the seal pattern to minimize problems due to contact between the seal pattern and the liquid crystal.

The seal pattern 520 for the liquid crystal dropping method may have a closed structure. As mentioned above, the seal pattern 520 can include conductive ball spacers therein and be conductive. Therefore, if the gate driver 420 is formed outside the seal pattern 520, the seal pattern 520 contacts the gate driver 420 or gate lines (not shown). The gate lines may be shorted therebetween or the gate lines may be shorted with the common electrode 406. To prevent this problem, in the second embodiment, the gate driver 420 is disposed inside the seal pattern 520.

In the case that the gate driver 420 may be disposed inside the seal pattern 520, the liquid crystal layer 460 may be also disposed on the gate driver 420, to thereby cause a parasitic capacitance between the gate driver 420 and the common electrode 406 with the liquid crystal layer 460 as a dielectric substance.

In the second embodiment of the invention, by disposing an auxiliary spacer 502 on the gate driver 420, the parasitic capacitance is prevented from being caused between the gate driver 420 and the common electrode 406. Here, the auxiliary spacer 502 is formed of an organic material. To decrease the number of processes, the auxiliary spacer 502 may be formed of the same material and through the same process as the column spacers 504. The auxiliary spacer 502 can cover the top of the gate driver 420.

In addition, as stated in the first embodiment, the auxiliary spacer 502 may be disposed on the signal line 425 or may be disposed on both the gate driver 420 and the signal line 425.

Figure 9:
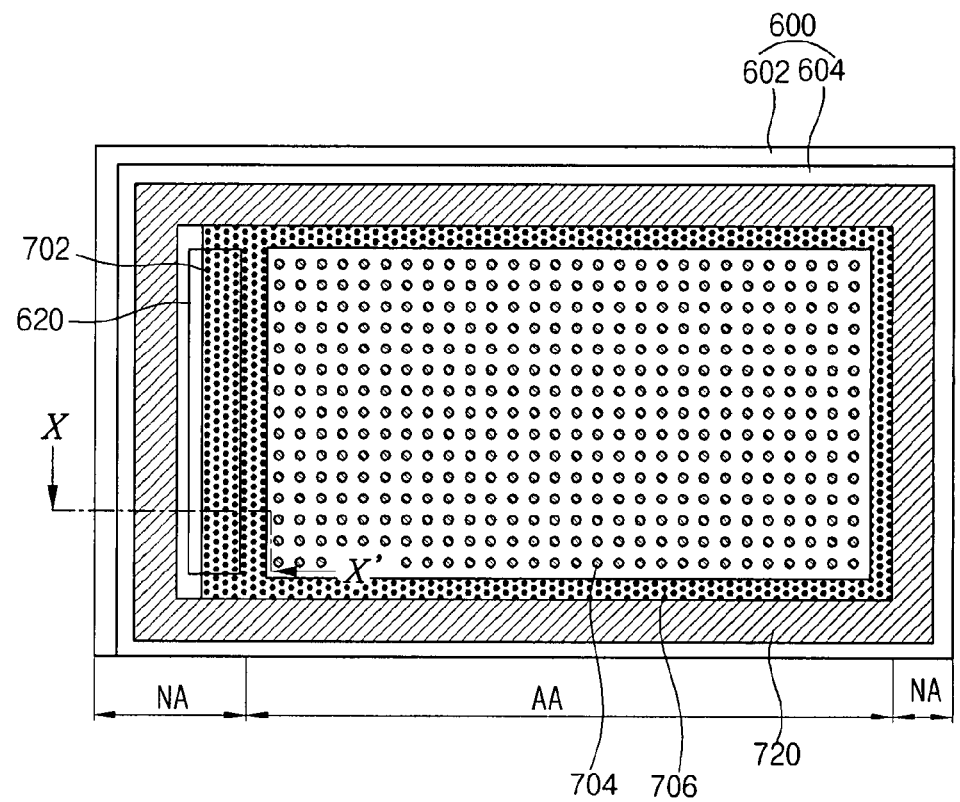
FIG. 9 is a plan view of a liquid crystal panel for an LCD device according to a third embodiment of the invention.
Figure 10:
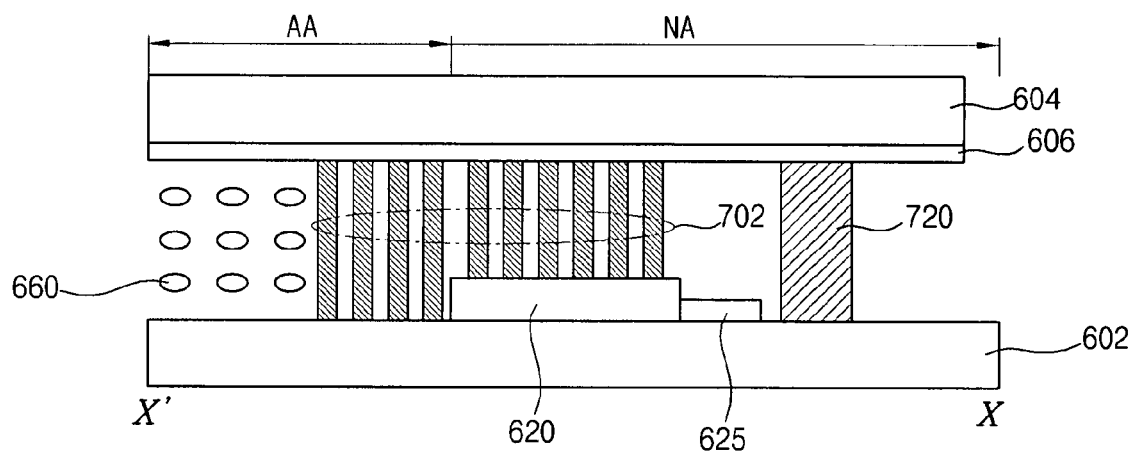
FIG. 10 is a cross-sectional view along the line X-X' of FIG. 9.

Meanwhile, when the liquid crystal may be dropped on the substrate without the seal pattern, there may be a problem that the dropped liquid crystal flows beyond the display area and outward. To solve the problem, another auxiliary spacer of a honeycomb-like structure may be further formed along a periphery of the display area. A liquid crystal panel including the auxiliary spacer of the honeycomb-like structure according to a third embodiment of the invention is illustrated in FIG. 9 and FIG. 10. FIG. 9 is a plan view of a liquid crystal panel for an LCD device according to the third embodiment of the invention. FIG. 10 is a cross-sectional view along the line X-X' of FIG. 9.

In FIG. 9 and FIG. 10, the liquid crystal panel 600 of the third embodiment includes first and second substrates 602 and 604 that overlap each other. A display area AA and a non-display area NA are defined on the first and second substrates 602 and 604. The display area AA displays images, and the non-display area NA surrounds the display area AA.

Column spacers 704 are formed in the display area AA between the first and second substrates 602 and 604 and correspond to regions except for pixel regions. The column spacers 704 keep a distance between the first and second substrates 602 and 604 uniform.

A seal pattern 720 is formed in the non-display area NA and surrounds the display area AA. The seal pattern 720 may include conductive ball spacers therein. A gate driver 620 and a signal line 625 for the gate driver 620 are formed in the non-display area NA. The gate driver 620 and the signal line 625 are disposed inside the seal pattern 720.

A first auxiliary spacer 702 is disposed on the gate driver 620. A second auxiliary spacer 706 is formed along a periphery of the display area AA between the first and second substrates 602 and 604. A liquid crystal layer 660 is interposed in the display area AA between the first and second substrates 602 and 604.

The first auxiliary spacer 702 may be in the non-display area NA along a side of the display area AA. The second auxiliary spacer 706 may surround the liquid crystal layer 660 in the display area AA. The first and second auxiliary spacers 702 and 706 can be closely spaced patterns (pattern structures) or, alternatively, a honeycomb-like structure. The first and second auxiliary spacers 702 and 706 prevent the dropped liquid crystal from flowing beyond the display area AA. As such, the distance between adjacent patterns (pattern structures) is shorter than the distance between adjacent column spacers. The width of each pattern structure of the first auxiliary spacer is narrower than the width of the signal line.

To reduce the number of processes, the first and second auxiliary spacers 702 and 706 may be formed of the same material and through the same process as the column spacers 704. The first auxiliary spacer 702 may be disposed on the signal line 625 or may be disposed on both the gate driver 620 and the signal line 625.

In the third embodiment, the first auxiliary spacer 702 of the plurality of closely spaced patterns or, alternatively, a honeycomb-like structure is disposed on the gate driver 620 such that parasitic capacitance is not caused between the gate driver 620 and the common electrode 606.

As stated above, the LCD device may be manufactured by forming unit cells for respective liquid crystal panels on large substrates and then cutting the substrates into the unit cells. As the substrates get larger, it is more important to maintain a uniform distance between two substrates. To do this, an additional auxiliary spacer may be further formed between adjacent unit cells.

Figure 11:
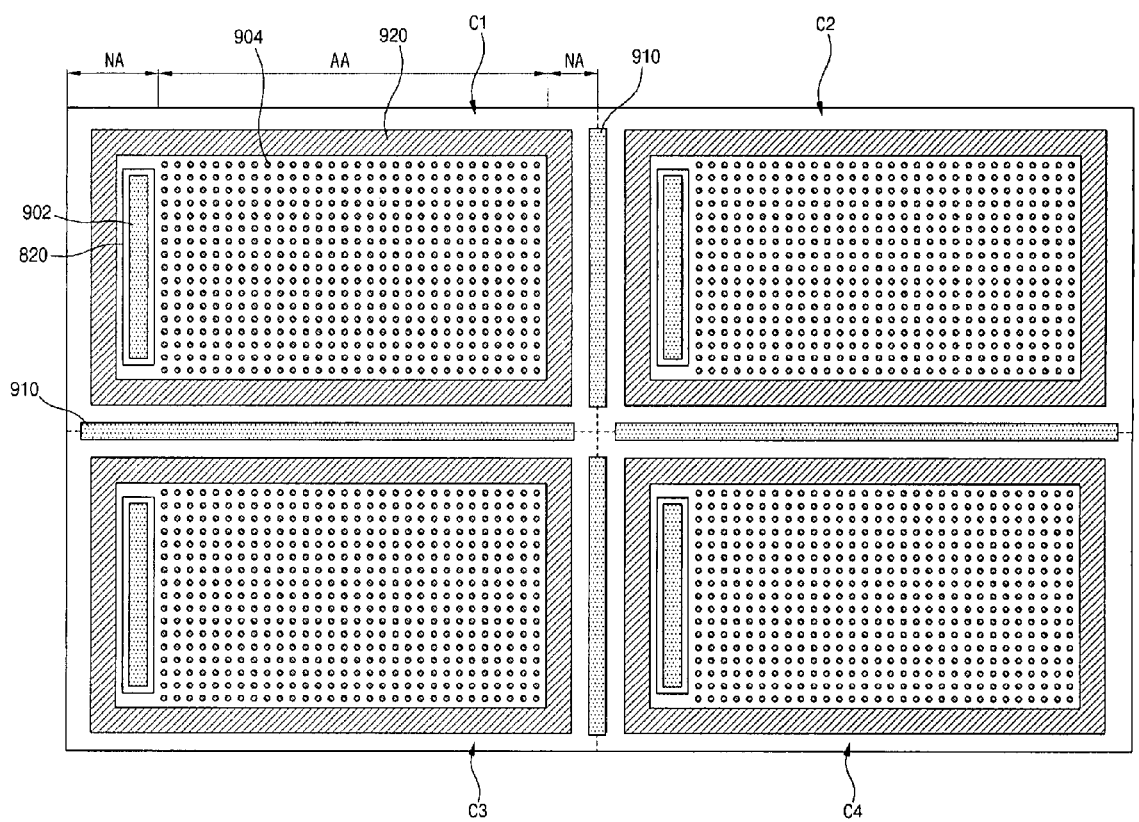
FIG. 11 is a schematic plan view of a liquid crystal panel for an LCD device according to a fourth embodiment of the invention.

A liquid crystal panel including an auxiliary spacer between adjacent unit cells according to a fourth embodiment of the invention is illustrated. FIG. 11 is a schematic plan view of a liquid crystal panel for an LCD device according to the fourth embodiment of the invention. FIG. 11 shows two attached substrates including unit cells for respective liquid crystal panels.

In FIG. 11, a display area AA and a non-display area NA are defined in each of unit cells C1, C2, C3 and C4. In the display area AA, column spacers 904 are formed, and a liquid crystal layer (not shown) is disposed. In the non-display area NA, a seal pattern 920 is formed and surrounds the display area AA. A gate driver 820 is formed inside the seal pattern 920 of the non-display area NA. A first auxiliary spacer 902 is disposed on the gate driver 820. A second auxiliary spacer 910 is formed between adjacent unit cells C1, C2, C3 and C4. The second auxiliary spacer 910 between any two of the unit cells C1, C2, C3 and C4 may be spaced apart from others or may be united with others. The first and second auxiliary spacers 902 and 910 may be formed of the same material and through the same process.

In a GIP type LCD device of embodiments of the invention, the parasitic capacitance is not caused between thin film transistors of the gate driver and the common electrode, and the thin film transistors of the gate driver may be prevented from working wrong. In addition, particles do not enter the gate driver during the manufacturing processes. Moreover, in a GIP type LCD device having a medium or large size, output of the gate-driving signals is prevented from being lowered due to delay of the signal line for the gate driver.

It will be apparent to those skilled in the art that various modifications and variations can be made in the gate-in-panel type liquid crystal display device and the method of manufacturing the same of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device, comprising:
   first and second substrates spaced apart from each other, on which a display area and a non-display area are defined;
   a liquid crystal layer interposed between the first and second substrates;
   a seal pattern in the non-display area between the first and second substrates;
   a driver with a signal line in the non-display area on the first substrate;
   column spacers in the display area between the first and second substrates; and
   a first auxiliary spacer between the signal line and the second substrate in the non-display area, the first auxiliary spacer comprising a plurality of pattern structures spaced apart from each other, a width of each pattern structure of the first auxiliary spacer being narrower than a width of the signal line, an entire bottom side surface of the first auxiliary spacer being in direct contact with the signal line,
   wherein a distance between adjacent pattern structures is shorter than a distance between adjacent column spacers,
   wherein the first auxiliary spacer is in direct contact with the driver and the signal line, and
   wherein the first auxiliary spacer is a honeycomb-like structure.

2. The liquid crystal display device according to claim 1, further comprising:
   a common electrode on the second substrate in the non-display area and in the display area,
   wherein the first auxiliary spacer is on the common electrode in the non-display area of the second substrate.

3. The liquid crystal display device according to claim 2, wherein:
   at least one side of the first auxiliary spacer is spaced apart from the seal pattern, and
   the first auxiliary spacer and the seal pattern are directly on and directly contact the common electrode in the non-display area of the second substrate.

4. The liquid crystal display device according to claim 1, further comprising a second auxiliary spacer along a periphery of the display area between the first and second substrates.

5. The liquid crystal display device according to claim 4, wherein the second auxiliary spacer is one of closely spaced pattern structures and a honeycomb-like structure.

6. The liquid crystal display device according to claim 5, wherein the first and second substrates have unit cells and a third auxiliary spacer is positioned between the unit cells.

7. The liquid crystal display device according to claim 1, wherein the first and second substrates have unit cells and a second auxiliary spacer is positioned between the unit cells.

8. The liquid crystal display device according to claim 1, wherein the driver is within the seal pattern.

9. The liquid crystal display device according to claim 8, further comprising a second auxiliary spacer along a periphery of the display area between the first and second substrates.

10. The liquid crystal display device according to claim 9, wherein the second auxiliary spacer is one of closely spaced pattern structures and a honeycomb-like structure.

11. The liquid crystal display device according to claim 9, wherein the first and second substrates have unit cells and a third auxiliary spacer is positioned between the unit cells.

12. The liquid crystal display device according to claim 8, wherein the first and second substrates have unit cells and a second auxiliary spacer is positioned between the unit cells.

13. The device according to claim 8, wherein the seal pattern includes conductive ball spacers therein.

14. The device according to claim 1, wherein the first auxiliary spacer is formed of a same material as the column spacers.

15. The device according to claim 1, wherein the first auxiliary spacer is formed of an organic material.

\* \* \* \* \*